United States Patent

[11] 3,571,594

[72] Inventor Lowell A. Nobel
        Hillsborough, Calif.
[21] Appl. No. 37,803
[22] Filed June 21, 1960
[45] Patented Mar. 23, 1971
[73] Assignee Varian Associates

[54] ELECTRONIC TUBE CONTAINING ACTIVE METAL
    8 Claims, 2 Drawing Figs.
[52] U.S. Cl. .................................................. 250/84.5,
                                              313/61, 316/7, 316/8
[51] Int. Cl. .................................................... G21g 3/04,
                                                              H01j 9/38
[50] Field of Search ........................................ 313/61, 61
                        (S); 250/84.5, (Digest); 316/7, 8

[56] References Cited
UNITED STATES PATENTS

| | | | |
|---|---|---|---|
| 2,816,242 | 12/1957 | Goodman.................... | 313/61 |
| 2,529,888 | 11/1950 | Sommer....................... | 316/7 |
| 2,783,117 | 2/1957 | Cope et al.................... | 316/8 |
| 2,964,634 | 12/1960 | Harris........................... | 250/84.5 |
| 2,769,096 | 10/1956 | Frey............................. | 313/61SX |
| 2,951,945 | 9/1960 | Goodman..................... | 313/61SX |

OTHER REFERENCES
Scott et al.-British Journal of Applied Physics-Vol. 10, No. 1, Jan. 1959-pages 91 to 93 inclusive-Copy in P.O. Scientific Library

*Primary Examiner*—Rodney D. Bennett, Jr
*Assistant Examiner*—Daniel C. Kaufman
*Attorneys*—Leon F. Herbert and Robert W. Dilts ABSTRACT: A neutron source tube comprising an evacuated envelope, a target of active metal in the tube, a hydrogen isotope sorbed in said target, a second member of active metal in said tube, a hydrogen isotope sorbed in said second member of active metal, spaced terminals on the outside of said envelope electrically connected respectively to said target and said second member of active metal whereby said target and said member become electrodes, a third electrode in said tube for establishing an arc between itself and said second member of active metal, a coating on said target preventing desorption of the hydrogen isotope in the target and being penetrable by hydrogen isotope ions, and a coating on said second member of active metal preventing desorption of the hydrogen isotope in the target and being destructible by said arc.

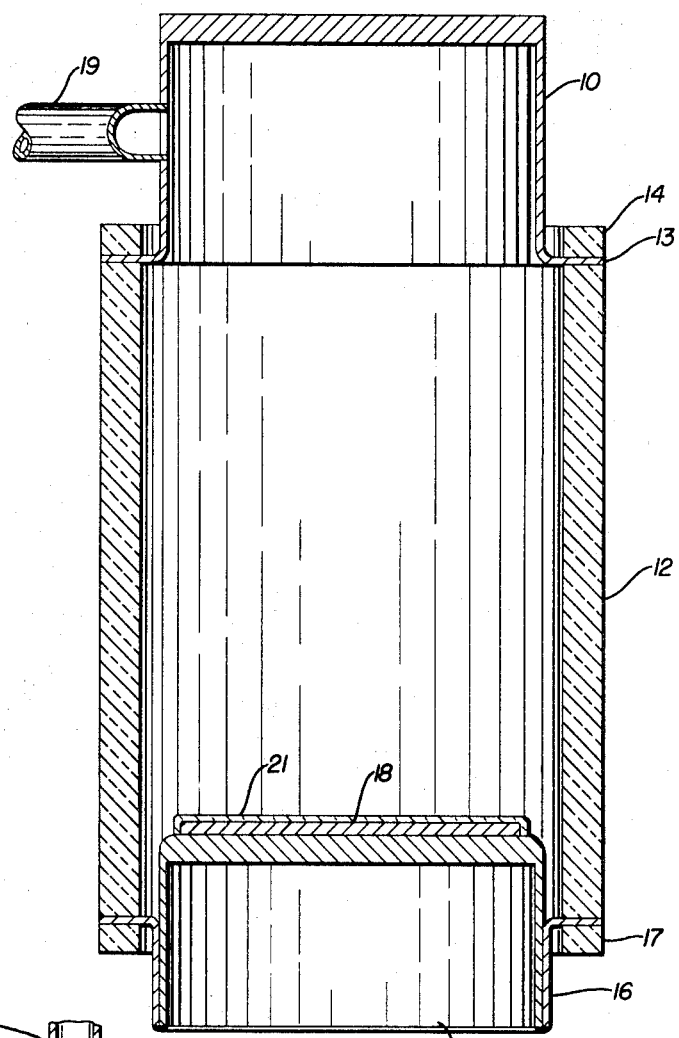
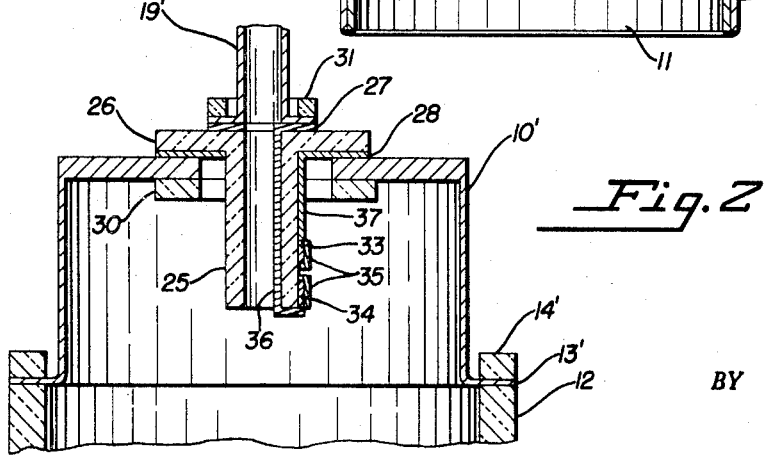
Fig. 1
Fig. 2
INVENTOR.
LOWELL A. NOBLE
BY
Leon F. Herbert
Robert W. Dilts
ATTORNEYS

ELECTRONIC TUBE CONTAINING ACTIVE METAL

This invention relates to the art of making vacuum tubes, particularly tubes which provide a source of neutrons.

In general a neutron source tube comprises a vacuumtight envelope filled with a hydrogen isotope gas (deuterium or tritium), an active metal target in the envelope loaded with a hydrogen isotope, and electrodes which can be energized to cause the gas to ionize and the ions to strike the target. When the ions strike the hydrogen isotope in the target, a well-known nuclear reaction occurs which liberates neutrons. It is also known that the yield of neutrons is substantially more when deuterium reacts with tritium than when deuterium reacts with deuterium, or when tritium reacts with tritium. Conventionally the target is made of an active metal such as titanium which will sorb large quantities of hydrogen isotopes. In another form the source tube is evacuated instead of gas filled and contains a supply of hydrogen isotopes which are sorbed in an active metal and can be desorbed and ionized by a spark discharge. The ions are then attracted to the target.

One problem associated with neutron source tubes in the past was that the pressure and composition of the gas in the envelope varied during the life of the tube, causing it to give erratic results.

According to this invention it was determined that the primary reason why the pressure and composition of the gas varied was that over a period of time some of the hydrogen isotope gas would be sorbed by the target and some of the hydrogen isotope in the target would be desorbed into the gas. In the case of the modified tube hydrogen would be desorbed from both the target and the supply metal. It is true that this action does reach equilibrium at a given gas pressure, and given temperature. However, temperature does not remain constant as a practical matter, and the time required to reach equilibrium is relatively long, particularly at low temperature. Therefore, equilibrium cannot be maintained and the interchange action does occur.

As previously mentioned the greatest neutron yield occurs when unlike hydrogen isotopes react with each other. In the past it was difficult to obtain this optimum neutron yield because if the tube or the supply metal were filled with one isotope of hydrogen and the target was filled with another, the isotopes would move from one place to another so that the supply metal, target and tube would each contain a mixture of isotopes, and some deuterium-deuterium or tritium-tritium reactions would occur which would lower the neutron yield. Even when a single isotope was used throughout in an attempt to obtain a uniform predictable neutron yield, the results were erratic because the active metals would sorb and desorb the hydrogen to cause a change in the gas pressure or vacuum and therefore a change in the operating conditions of the tube.

Another feature of the invention which relates to optimum neutron yield and constant gas pressure or vacuum has to do with the fact that the neutron yield increases with increase in the ratio of hydrogen to active metal in the target. Prior to this invention it was not possible to utilize the maximum ratio because the hydrogen isotope in the target would be desorbed into the tube, particularly in the case of the vacuum-type tube. This of course reduces the ratio of hydrogen to active metal; and particularly in the case of the vacuum-type tube, causes such an increase in the pressure in the tube that the tube becomes inoperable.

Thus, an object of this invention is to provide an improved neutron source tube capable of predictable high neutron yield.

Another object of this invention is to provide a neutron source tube which can be stored for long periods of time without detrimental effect.

A further object of the invention is to inhibit the sorption and desorption of hydrogen by the active metal in a neutron source tube.

By way of brief description the invention involves placing on the active metal in the tube a coating which can, in the case of the supply metal, be removed to allow desorption, and which can, in the case of the target, be penetrated by hydrogen ions.

The invention contains other objects and features of advantage some of which, with the foregoing, will be set forth in the following description of the invention. The invention is not limited to the disclosed embodiment, as variant embodiments thereof are contemplated and may be adopted within the scope of the claims.

Referring to the drawing:

FIG. 1 is an axial cross section of a gas-type neutron source tube.

FIG. 2 is a cross section of an alternate embodiment of one end of the tube in FIG. 1 whereby the structure becomes a vacuum-type neutron source tube.

Referring to the drawing in detail FIG. 1 shows a gastight envelope comprising two cup-shaped electrodes 10 and 11 disposed at opposite ends, with a tubular ceramic insulator 12 between the two. A flange 13 on the rim of the cup-shaped electrode 10 is sealed vacuumtight to one end of the ceramic 12 with ceramic backing ring 14 sealed to the flange 13 opposite ceramic 12 to reinforce the bond between metal flange 13 and ceramic cylinder 12.

The other end of cylinder 12 is sealed vacuumtight to the electrode 11 with the aid of a metal sealing ring 16 which is arc-welded to the rim of the electrode 11. The vacuumtight seal between the ring 16 and the ceramic cylinder 12 also employs a ceramic backing ring 17 to strengthen the seal.

A neutron source tube has a target which in this tube is the electrode 11 on which a layer 18 of an active metal is disposed on the inner surface as shown. Titanium is the preferred active metal, but of course the layer 18 may be made of other active metals, such as zirconium, hafnium, lithium, lanthanum, yttrium, or thorium. A hydrogen isotope, either deuterium or tritium is sorbed by the active metal in accordance with a standard process such as first baking out and outgassing the tube by heating the tube and forming a vacuum therein by fixing a suitable vacuum pump (not shown) to a tubulation 19 which communicates with the interior of the tube through the electrode 10, and then supplying hydrogen isotope gas into the tube through the tubulation as the tube is cooled. There are other processes for sorbing hydrogen within an active metal and the invention is not limited to the particular process described.

After the tube has been outgassed and the active metal has been loaded with a hydrogen isotope, the standard practice was then to obtain the desired pressure of hydrogen isotope gas in the tube and finally seal the tube by "pinching off" tubulation 19.

According to this invention, however, after the optimum amount of hydrogen isotope is sorbed by the titanium 18, the hydrogen is removed through the tubulation 19 and oxygen is supplied through the tubulation at a pressure preferably between 200 and 400 millimeters of mercury for about 1 hour duration at a temperature range of 150°—200° C. These parameters produce an oxide coating or layer 21 on the titanium which is impervious to hydrogen isotope molecules because the oxide forms a tight and adherent coating on the titanium. Other gases such as nitrogen, chlorine carbon vapor, or gases containing carbon can be substituted for oxygen. The main requirement is that the gases must react with the active metal to form the impervious thin coating at a temperature of about 200° C. or under so that the hydrogen isotope is not desorbed from the active metal during the formation of the impervious coating. After the loaded target has thus been protected by the impervious coating, the oxygen is removed through tubulation 19, the desired hydrogen isotope gas is supplied through the tubulation, and the tube is sealed by "pinching off" the tubulation 19.

In order to operate the tube of FIG. 1, an external power source (not shown) is connected to electrodes 10 and 11 to form a potential gradient between them which will cause the hydrogen isotope gas to ionize. The target electrode 11 is made negative with respect to electrode 10 so that the positive ions will strike the target. When the ions strike the target they will penetrate the coating 21 and will strike the hydrogen isotope in the active metal 18 to cause the neutron yielding reaction previously described. The coating 21 should not be made too thick because the energy required to force ions through the coating will increase as the thickness of the coating increases.

Thus it will be understood that the invention provides a coating on the active metal which prevents desorption and further sorption of hydrogen isotopes by the active metal while at the same time being penetrable by hydrogen isotope ions. In this way it is possible to load the active metal target with the optimum amount of one hydrogen isotope, fill the tube with another hydrogen isotope at optimum pressure, and have these conditions remain static until the tube is operated.

Referring now to the vacuum-type tube disclosed in FIG. 2, it will be understood that this tube has a vacuumtight envelope comprising the same lower structure as shown in FIG. 1 including cylindrical sidewall 12, and elements 11, 16, 17, 18 and 21. The two tubes differ only at their upper ends where in FIG. 2 a cup-shaped metal member 10' replaces the electrode 10 of FIG. 1. Member 10' is provided with a flange 13' which is metallically bonded to the upper end of cylinder 12, and a ceramic backing ring 14' is bonded to the upper surface of flange 13' to reinforce the seal. The end of member 10' is apertured to receive a tube 25 of insulating material such as ceramic having a rim portion 26. The top and bottom surfaces of rim 26 are provided with annular metallic coatings 27 and 28, respectively. Coating 28 is brazed to the end of member 10', and a ceramic backing ring 30 is brazed to the inside of member 10' to reinforce the seal. A metal tubulation 19' is brazed to the upper metallic coating 27 on rim 26, and a ceramic backing ring 31 is brazed on the tubulation for reinforcement. Ceramic tube 25 is coated with two spaced metal strips 33 and 34 of active metal such as titanium, zirconium or hafnium. The oxide or other protective coating as described in connection with FIG. 1 is represented by 35 on active metal layers 33 and 34 in FIG. 2. A narrow strip of metallizing 36 connects active metal 34 to the metallizing layer 27 and thus to tubulation 19'. Similarly, a narrow strip of metallizing 37 connects active metal 33 to the metallizing layer 28 and thus to member 10'. It should be understood that active metal layers 33 and 34 are also narrow strips extending along the ceramic tube 25 but not around it.

The vacuum-type tube described in connection with FIG. 2 is processed in exactly the same manner described in connection with the tube of FIG. 1 except that instead of introducing a hydrogen isotope gas after the active metal surfaces have been protected by the impervious coatings 21 and 35, the tube is evacuated and then sealed by "pinching off" tubulation 19'. It should be understood that metal layers 18, 34 and 35 are the only active metals in the tubes of FIGS. 1 and 2, all the other metal parts being nonactive metals.

In order to operate the tube of FIG. 2, an external power source (not shown) is connected to member 10', the portion of 19' remaining after pinch off, and electrode 11. A potential difference can thus be obtained across active metal layers 33 and 34 to cause a spark between them, which spark will destroy the coating 35 causing desorption of the hydrogen isotope in the layers 33 and 34. The spark will also cause ionization of the desorbed isotope. As in the case of FIG. 1, the target 11 of the vacuum-type tube is negative so that ions will strike it to cause the neutron-yielding reaction. Although it is preferred to have the spark between two loaded metal areas 33 and 34, it will be understood that the nonactive metallizing strip 36 or 37 could be extended to replace area 34 or 33 so that only one of the spark electrodes would be a loaded active metal.

I claim:

1. A neutron source tube comprising a gastight envelope, a target of active metal in the tube, a material sorbed in the target, an ionizable material in the tube outside the target and reactable with said sorbed material in the target to yield neutrons, means for ionizing a portion of said ionizable material and accelerating the resulting ions toward said target, a continuous coating on said target, said coating being impervious to said sorbed material in the target whereby desorption of said sorbed material in the target is prevented, said coating being impervious to nonionized portions of the material outside the target whereby sorption of said nonionized portions of material outside the target is prevented, and said coating being penetrable by accelerated ions of said material outside the target.

2. The neutron source tube of claim 1 wherein the active metal of said target is one of the group consisting of titanium, zirconium, hafnium, lithium, lanthanum, yttrium, and thorium.

3. The neutron source tube of claim 1 wherein said material sorbed in the target and said material outside the target are isotopes of hydrogen.

4. The neutron source tube of claim 1 wherein said coating is an oxide form of said active metal.

5. The neutron source tube of claim 1 wherein said active metal is one of the group consisting of titanium, zirconium, and hafnium, said coating is an oxide form of said active metal, and said material sorbed in the target and said material outside the target comprise hydrogen isotopes of deuterium and tritium, one of said isotopes being the material sorbed in the target and the other of said isotopes being the material outside the target.

6. A neutron source tube comprising a gastight envelope, a target of active metal in the tube, a hydrogen isotope sorbed in said target, a hydrogen isotope gas in the tube, a terminal on the outside of the tube electrically connected to said target whereby said target becomes an electrode, a second electrode in the tube spaced from said target, said electrodes providing means for accelerating ions toward said target, a continuous coating on said target, said coating being impervious to the hydrogen isotope in the target whereby desorption of said isotope in the target is prevented, said coating be impervious to the hydrogen isotope gas in the tube whereby sorption of the isotope gas is prevented, and said coating being penetrable by accelerated ions of said isotope gas in the tube.

7. A neutron source tube as claimed in claim 6 in which said active metal comprises one of the group consisting of titanium, zirconium, hafnium, lithium, lanthanum, yttrium and thorium, said isotope in the target and said isotope in the tube are different isotopes of hydrogen, and said coating contains an element which reacts with the active metal below the temperature at which the active metal appreciably desorbs the hydrogen isotope sorbed therein.

8. A neutron source tube comprising an evacuated envelope, a target of active metal in the tube, a hydrogen isotope sorbed in said target, a second member of active metal in said tube, a hydrogen isotope sorbed in said second member of active metal, spaced terminals on the outside of said envelope electrically connected respectively to said target and said second member of active metal whereby said target and said member become electrodes, a third electrode in said tube for establishing an arc between itself and said second member of active metal, a coating on said target preventing desorption of the hydrogen isotope in the target and being penetrable by hydrogen isotope ions, and a coating on said second member of active metal preventing desorption of the hydrogen isotope in the target and being destructible by said arc.